US012723643B2

(12) United States Patent
Künig et al.

(10) Patent No.: US 12,723,643 B2
(45) Date of Patent: Sep. 1, 2026

(54) METHOD FOR ASSEMBLING A DRIVE TRAIN COMPONENT

(71) Applicant: GKN Automotive Limited, Birmingham (GB)

(72) Inventors: Florian Künig, Brunico (IT); Hanspeter Putzer, Brunico (IT); Sigmund Senoner, Brunico (IT); Carlo Faustini, Brunico (IT)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/913,195

(22) Filed: Oct. 11, 2024

(65) Prior Publication Data

US 2025/0122931 A1 Apr. 17, 2025

(30) Foreign Application Priority Data

Oct. 12, 2023 (DE) ..................... 10 2023 127 938.6

(51) Int. Cl.
*F16H 57/022* (2012.01)

(52) U.S. Cl.
CPC ... *F16H 57/022* (2013.01); *F16H 2057/0228* (2013.01)

(58) Field of Classification Search
CPC ................. F16H 2057/0228; F16H 2057/0056
See application file for complete search history.

(56) References Cited

U.S. PATENT DOCUMENTS

| | | | | |
|---|---|---|---|---|
| 4,648,766 | A * | 3/1987 | Wollar | F16B 19/1081 411/41 |
| 9,033,838 | B2 | 5/2015 | Kluge et al. | |
| 2020/0177059 | A1* | 6/2020 | Smith | H02K 24/00 |
| 2022/0186456 | A1 | 6/2022 | Geiger | |
| 2022/0325780 | A1* | 10/2022 | Kim | F16H 1/32 |
| 2024/0044401 | A1* | 2/2024 | Tanioka | F16H 49/001 |

FOREIGN PATENT DOCUMENTS

| | | | | |
|---|---|---|---|---|
| DE | 102011053495 B4 | 5/2019 | | |
| DE | 102018119516 A1 * | 1/2020 | | F16H 55/36 |
| DE | 102020133211 A1 | 6/2022 | | |
| WO | WO-2004055410 A1 * | 7/2004 | | F16H 57/023 |

OTHER PUBLICATIONS

USPTO Machine Translation (retrieved from FIT database) of the Description of DE 102018119516 A1, Sieber et al., Jan. 2, 2020. (Year: 2025).*
DE Office Action for DE Application No. 102023127938.6 dated Jun. 10, 2024 (6 pages).

* cited by examiner

*Primary Examiner* — Daniel D Yabut
(74) *Attorney, Agent, or Firm* — Reising Ethington P.C.

(57) ABSTRACT

A method for assembling a component of a drive train is provided. The component includes at least a first part with a plurality of threaded holes and a second part with a corresponding number of through holes. The threaded holes and through holes each extend along an axial direction.

9 Claims, 4 Drawing Sheets

Fig. 5
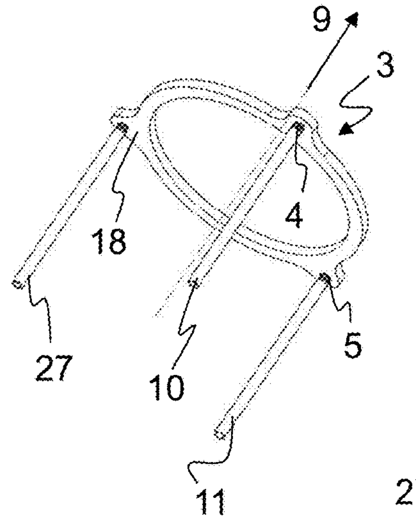
Fig. 6
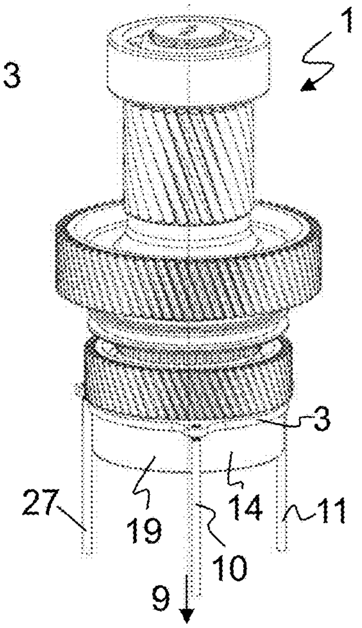
Fig. 7
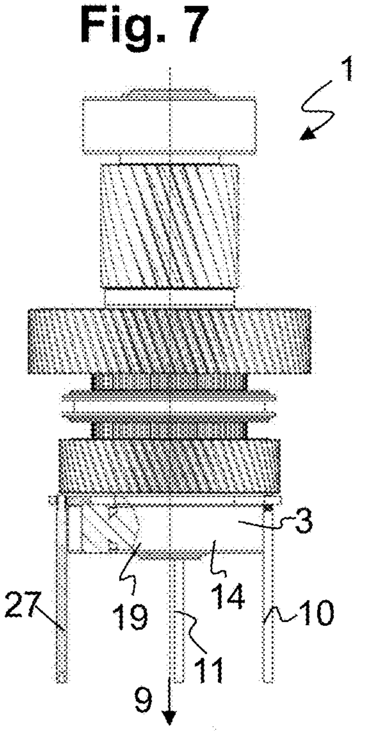
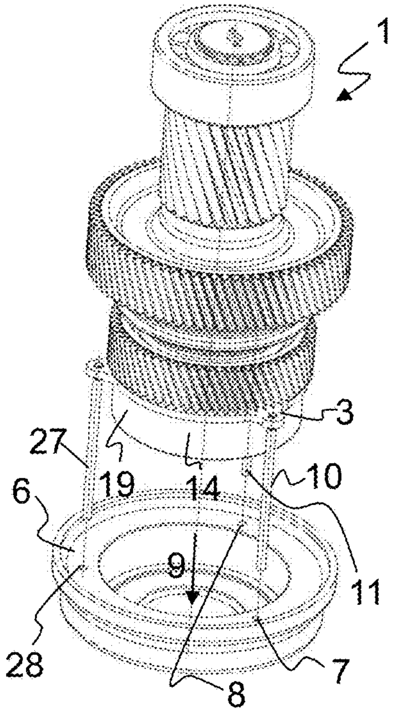
Fig. 8
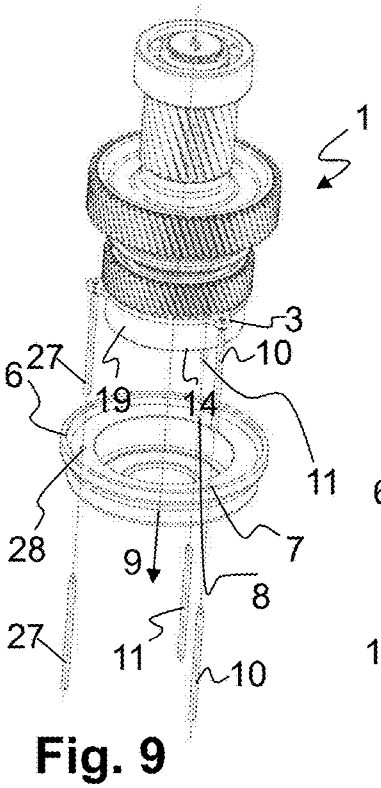
Fig. 9
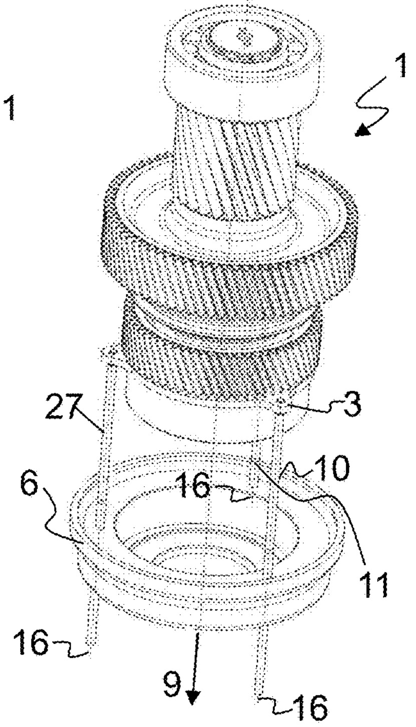
Fig. 10

Fig. 11
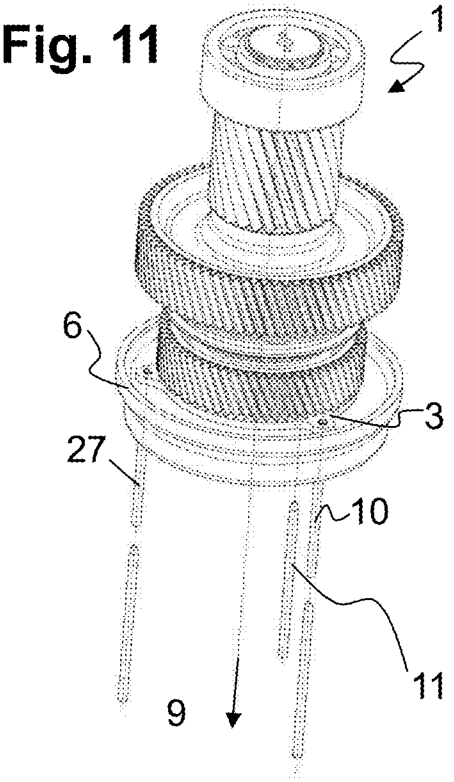
Fig. 12
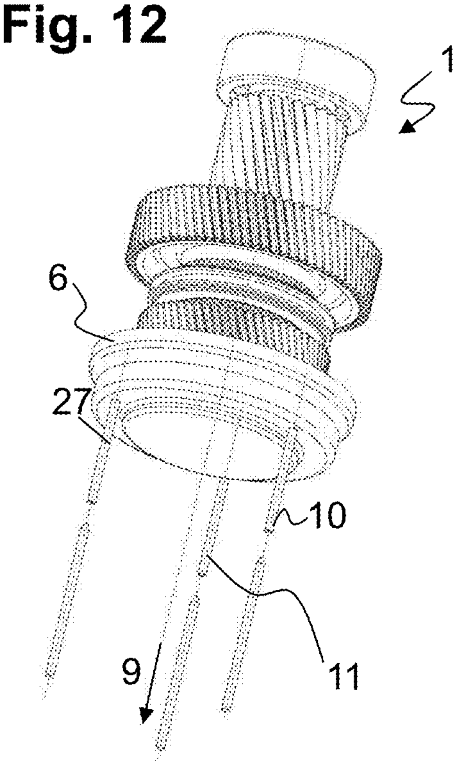
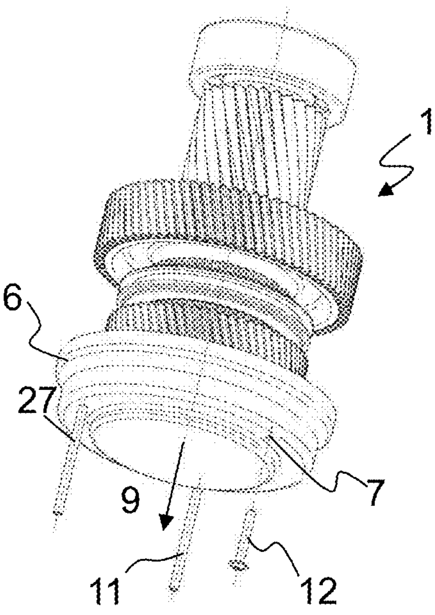
Fig. 13
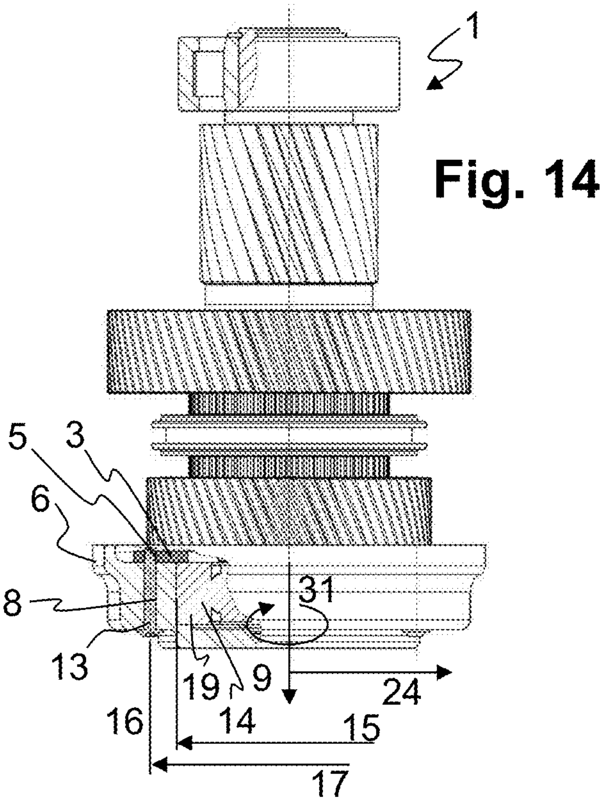
Fig. 14
1
6
3
27
10
11
9
1
6
27
10
9
11
1
6
27
9
7
11
12
1
5
3
6
8
31
13
19
9
24
16
14
15
17

METHOD FOR ASSEMBLING A DRIVE TRAIN COMPONENT

INTRODUCTION

The present disclosure relates to a method for assembling a component of a drive train. The drive train is provided in particular for a motor vehicle.

The component is, for example, a part of a transmission or a differential. In particular, the method is used to arrange and fix a rolling bearing in a housing. In particular, the rolling bearing is used to support a rotating component within a housing.

The rolling bearing is in particular a groove ball bearing. In particular, the component comprises at least the rolling bearing, a bearing support part and a housing part. An outer ring of the rolling bearing can be fixed to the housing part via the bearing support part.

Accessibility restrictions often need to be taken into account. For example, the bearing support part can only be fixed from outside the housing part using screws. Certain adjustments are required for this type of connection between the bearing support part and screws, which cannot be seen from outside the housing part, e.g. to align the bearing support part with the rolling bearing or with the housing part so that the screws can be inserted into the threaded holes in the bearing support part provided for this purpose.

However, these adjustments result in higher costs in the manufacture of the individual parts. Alternatively or additionally, the parts or component must be larger or more complex (e.g. multi-part), e.g. to ensure accessibility. In particular, the multi-part design of the parts used, e.g. those used as part of a housing, can increase the risk of the housing leaking.

SUMMARY

An object per an embodiment is to at least partially solve the problems mentioned with reference to the prior art. In particular, a method for assembling a component of a drive train is to be proposed, for which no special features are required on the individual parts of the component. Furthermore, it should be possible to realize a compact design of the component with the smallest possible number of parts.

Features listed individually in the claims can be combined with each other in a technologically meaningful way and can be supplemented by explanatory facts from the description and details from the figures, whereby further embodiments of the disclosure are shown.

According to an embodiment, a method for assembling a component of a drive train is proposed. The component comprises at least a first part with a plurality of threaded holes and a second part with a corresponding number of through holes. The threaded holes and the through holes each extend along an axial direction. The method comprises at least the following steps:

a) Providing the first part and the second part;
b) arranging at least two guide elements in the threaded holes of the first part, each guide element extending through one of the through holes;
c) bringing the first part and the second part together along the axial direction, whereby the parts are aligned with each other via the guide elements;
d) inserting a first screw element via a first through hole into a first threaded hole and screwing the first screw element;

e) removing a guide element from the component and inserting a second screw element via a second through-hole into a second threaded hole and screwing the second screw element to produce the component.

According to an embodiment, the above (non-exhaustive) categorization of the methods steps into a) to e) is intended primarily for differentiation purposes only and is not intended to enforce any sequence and/or dependency. The frequency of the process steps, e.g. during the assembly of the component, can also vary. It is also possible for method steps to at least partially overlap in time. Method steps c) to e) are preferred, per an embodiment, to take place after steps a) and b). In particular, the guide elements can be inserted into the threaded holes via the through holes. Alternatively, the guide elements can be arranged in the threaded holes and then inserted into the through holes. Steps d) and e) are carried out per an embodiment after steps a) to c). In particular, steps a) to e) are carried out in the order indicated, per an embodiment.

According to an embodiment, the first part is, in particular, a bearing support part. The first part is in particular ring-shaped or disc-shaped. The first part is in particular a sheet metal part. In particular, the threaded holes are evenly distributed along a circumferential direction. In various embodiments, at least two, preferably exactly three, possibly even more than three threaded holes are provided. The threaded holes can be designed as blind holes or through holes. The threaded holes comprise at least one cylindrical cavity in which a thread may be arranged.

According to an embodiment, the second part is in particular a housing part of the component. The second part is in particular a part manufactured by a casting process, i.e. a cast part. The through holes are arranged in particular evenly distributed along a circumferential direction. In particular, at least two, preferably exactly three, possibly even more than three through holes are provided. In particular, the through holes do not have a thread so that the guide elements can be accommodated in the through-holes so that they can be displaced along the axial direction.

According to an embodiment, the number of threaded holes corresponds to the number of through holes.

According to an embodiment, the threaded holes and the through holes extend parallel to each other along the axial direction.

According to an embodiment, the guide elements are pin-shaped, especially cylindrical. Preferably, the guide elements have a thread at one end so that they can be connected to the thread of the threaded hole via the thread. Alternatively, the guide elements are designed without a thread so that they can be inserted into the threaded hole.

According to an embodiment, before step c), the guide elements are arranged in the threaded holes and extend through the through holes. Preferably, one guide element is assigned to each threaded hole and/or each through hole, but fewer guide elements, but at least two, can also be used. In particular, the guide elements can be inserted into the threaded holes of the first part via the through holes of the second part. Alternatively, the guide elements can already be arranged in the threaded holes of the first part and only then be inserted into the through holes of the second part.

According to an embodiment, in step c), the first part and the second part are brought together along the axial direction. The parts are previously arranged at a distance from each other along the axial direction and are arranged in a position relative to each other in step c), in which they are then inserted into the drive train. During step c), i.e. while the parts are being brought together, the parts are aligned with each other via the guide elements. Aligning the parts using the guide elements may only involve fixing the position of the parts aligned relative to each other. The alignment can therefore also be supported by a fixing device by means of which the parts can be arranged in the desired position relative to one another, whereby the guide elements, which extend through the through holes into the threaded holes, can then fix this position.

According to an embodiment, the second part is displaced relative to the guide elements and relative to the first part along the axial direction.

According to an embodiment, in step d), in particular, a first screw element is inserted via a first through hole into a first threaded hole and the first screw element is screwed into place. If necessary, in step d) (and before step e)) further screw elements can be inserted into further through holes and screwed into the threaded hole which is accessible via the respective through hole.

According to an embodiment, at least one guide element is first removed from the component in step d) and a first screw element is (subsequently) inserted into a first threaded hole via a first through hole. The first screw element is then screwed to the first threaded hole by screwing. In particular, the one guide element is replaced by the first screw element.

According to an embodiment, in step e), a (further) guide element is removed from the component and a (further) second screw element is inserted into a second threaded hole via a second through hole. In step e), the (further) second screw element is screwed to the second threaded hole. In step e), all further screw elements can be arranged in corresponding through holes and screwed to the threaded holes provided for this purpose. In particular, all guide elements are removed from the component as part of step e). Once all the screw elements provided have been screwed in place, the component is (completely) manufactured.

According to an embodiment, the guide elements ensure that the first part is aligned relative to the second part. This allows screw elements to be supplied via the second part, which are used to fix the first part in the component. The guide elements ensure that the screw elements can be brought into engagement with the threaded holes.

According to an embodiment, the first part is supported by the guide elements with respect to the axial direction, so that the forces that are required or occur when the screw elements are attached, e.g. automatically, are absorbed by the guide elements.

According to an embodiment, a third part is arranged along the axial direction between the first part and the second part, which is arranged in a fixed position (in the component) relative to the axial direction by the first part and the second part as a result of the assembly of the component.

According to an embodiment, the third part is a rolling bearing that can be arranged in a fixed position relative to the second part by the first part, at least relative to the axial direction.

According to an embodiment, the third part has a largest first diameter. In particular, all center axes of the threaded holes are arranged on a common second diameter, wherein the second diameter is at most 30%, preferably at most 20% larger than the first diameter. The second diameter is at most 200 millimeters, preferably at most 150 millimeters, particularly preferably at most 120 millimeters.

According to an embodiment, with the proposed method, it is possible in particular to arrange the threaded holes on the first part as close as possible to the largest (first) diameter of the third part. This ensures that the first part is arranged as flat as possible on the third part.

According to an embodiment, the first part is ring-shaped. In particular, at least a first end face of the first part pointing towards the third part is completely flat. In particular, the other end face of the first part, which points in the opposite axial direction, is also completely flat. This means that the first part is in particular disc-shaped with parallel and completely flat end faces. Accordingly, the first part can be manufactured as a simple, flat sheet metal part and, in particular, without further forming.

According to an embodiment, the third part is a rolling bearing. In particular, the first part is a bearing support part for fastening the rolling bearing (of the third part) in the component. In particular, the rolling bearing is designed as a ball groove bearing.

According to an embodiment, an arrangement of other rolling bearings (e.g. roller bearings with inclined rolling elements or tapered roller bearings) is not possible or not desired for certain components, e.g. with regard to low friction. The rolling bearing provided here as the third part is designed in particular as a so-called fixed bearing of a fixed/compensating bearing arrangement.

According to an embodiment, the rolling bearing has at least one outer ring, one inner ring and rolling elements arranged between them. In particular, the bearing support part contacts the rolling bearing via the outer ring and a second end face of the outer ring that contacts the bearing support part is completely flat.

According to an embodiment, the shape or design of the third part (in particular the rolling bearing) and the first part (in particular the bearing support part) does not enable or ensure alignment of the first part (the bearing support part), at least not with respect to the radial direction and/or the circumferential direction or with respect to the second part. This alignment of the first part (or the bearing support part) is ensured in particular exclusively via the guide elements (and later via the screw elements).

The second end face of the outer ring, which is flat or parallel to the radial direction, ensures low manufacturing costs for the rolling bearing because it can be integrated or installed in the component as a simple purchased part (without special adjustments, i.e. shoulders, centring surfaces, etc.).

According to an embodiment, the third part is provided in particular as an assembly, e.g. as part of a differential or a (different) gearbox. The third part is part of the assembly. For example, the third part, which is designed as a rolling bearing, is arranged on a cylindrical section of the assembly via the inner ring and is preferably fixed in position relative to the axial direction, e.g. via a retaining ring.

According to an embodiment, the first part is held by a fixing device at least before step c), the fixing device being removed to bring the parts together in accordance with step c).

According to an embodiment, at least prior to step c), the first part is aligned at least relative to the second part only by the fixing device with respect to a radial direction extending transversely to the axial direction.

According to an embodiment, an alignment of the first part with respect to the second part (and in particular with respect to a radial direction and/or a circumferential direction) can be ensured via the fixing device, so that the guide elements can be arranged in the threaded holes via the through holes.

According to an embodiment, the fixing device is designed in at least two parts. In particular, the individual parts of the fixing device are movable relative to one another at least along the radial direction.

According to an embodiment, the fixing device can be designed in two or more parts so that the fixing device can be removed after the first part has been aligned with respect to the second part or after the guide elements have been arranged in the threaded holes.

According to an embodiment, removal of the fixing device is particularly necessary if accessibility of the first part is no longer guaranteed after or even during step c) of the method.

According to an embodiment, a component of a drive train of a motor vehicle is further proposed. The component comprises at least a first part with a plurality of threaded holes and a second part with a corresponding number of through holes, wherein a screw element extends through each through hole into a respective threaded hole along an axial direction, so that the parts are connected to one another by the screw elements. The component is assembled using the method described.

According to an embodiment, it can be seen from the assembled component or from the design of the individual parts that the method described must be carried out to assemble the parts.

According to an embodiment, the first part is aligned with respect to the second part and/or the third part exclusively by the screw elements relative to a radial direction extending transversely to the axial direction. Without the screw elements, the first part with the threaded holes would therefore be displaceable relative to the second part and/or the third part along the radial direction and/or the circumferential direction such that screwing the screw elements into the threaded holes via the through holes would not be readily possible.

According to an embodiment, the component comprises an additional third part, wherein the first part is a bearing support part, the second part is a housing part of the component and the third part is a rolling bearing.

According to an embodiment, the component is at least an assembly of a transmission, e.g. a differential or another transmission. The third part designed as a rolling bearing is arranged in particular on a shaft of the gearbox or on a differential housing part via an inner ring of the rolling bearing.

According to an embodiment, the method described can, in particular, be partially or fully automated. In particular, a control unit is then provided which is equipped, configured or programmed to carry out the method. The individual parts, the guide elements, the screw elements or the fixing device and other auxiliary devices can, for example, be handled, controlled and moved relative to one another by the control unit or devices or auxiliary devices controlled by it.

According to an embodiment, the method can also be carried out by a computer or with a processor of a control unit.

According to an embodiment, a data processing system is also proposed comprising a processor adapted/configured to perform the method or part of the steps of the proposed method.

According to an embodiment, a computer-readable storage medium may be provided, comprising instructions which, when executed by a computer/processor, cause the computer/processor to perform the method or at least part of the steps of the proposed method.

The embodiments of the method are transferable to the component, the control unit and/or the computer-implemented method (i.e. the computer or processor, the data processing system, the computer-readable storage medium) and vice versa.

The use of indefinite articles ('a', 'an'), in particular in the claims and the description reproducing them, is to be understood as such and not as a number word. Accordingly, terms or components introduced thereby are to be understood as being present at least once and, in particular, may also be present more than once.

As a precaution, it should be noted that the number words used here ('first', 'second', . . . ) are primarily (only) used to distinguish between several similar objects, quantities or processes, i.e. in particular they do not necessarily specify any dependency and/or sequence of these objects, quantities or processes in relation to one another. If a dependency and/or sequence is required, this is explicitly stated here or is obvious to the person skilled in the art when studying the specific embodiment described. Insofar as a component may occur more than once ('at least one'), the description of one of these components may apply equally to all or some of the plurality of these components, but this is not mandatory.

BRIEF DESCRIPTION OF THE FIGURES

The invention and the technical environment are explained in more detail below with reference to the figures. It should be noted that the invention is not intended to be limited by the embodiments shown. In particular, unless explicitly shown otherwise, it is also possible to extract partial aspects of the matters explained in the figures and to combine them with other components and findings from the present description and/or figures. Identical reference signs denote identical objects, so that explanations from other figures can be used as a supplement if necessary. It shows schematically:

FIG. 5: a perspective view of a first part of a second embodiment of a component before step b);

FIG. 6: the first part according to FIG. 5 together with a third part, in a perspective view;

FIG. 7: the parts according to FIG. 6 in a side view, partially in section;

FIG. 8: the parts according to FIGS. 6 and 7 together with a second part, in a perspective view;

FIG. 9: a perspective view of the component according to FIG. 8 together with other parts of the multi-part guide elements;

FIG. 10: perspective view of the component according to FIG. 9, during step c);

FIG. 11: a perspective view of the component according to FIG. 10, with parts of the multi-part guide elements being removed;

FIG. 12: the component according to FIG. 11, in another perspective view;

FIG. 13: the component according to FIGS. 10 and 11, during step d), in a perspective view; and FIG. 14: the component according to FIG. 13, after step d), in a side view, partially in section.

DETAILED DESCRIPTION

Figure 1:
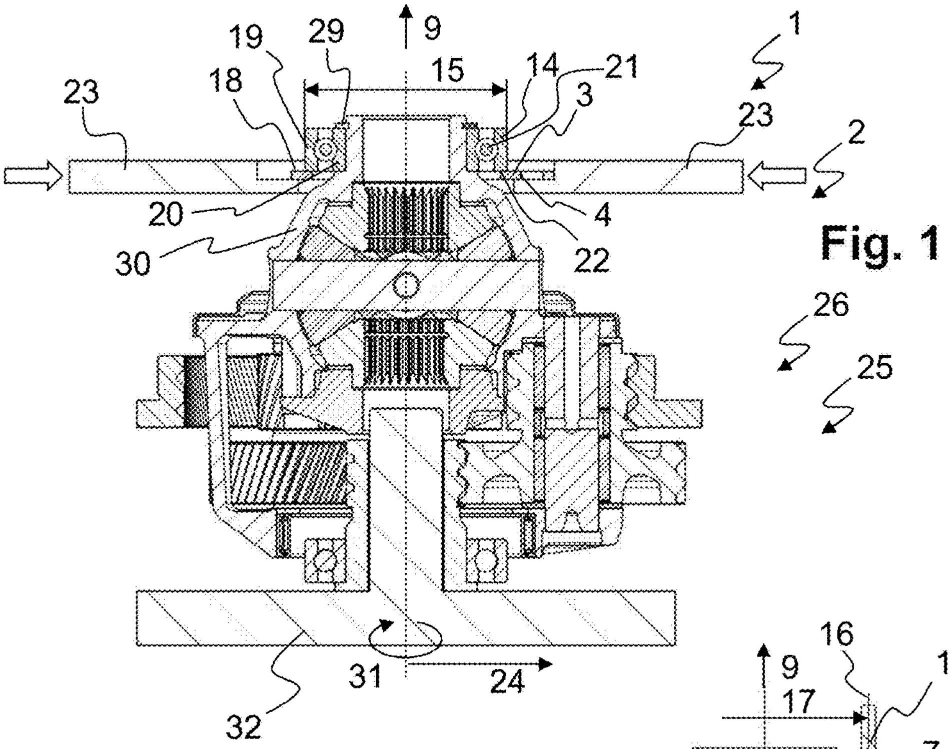
FIG. 1: a motor vehicle with a drive train and part of a first embodiment of a component in a side view in section.
Figure 2:
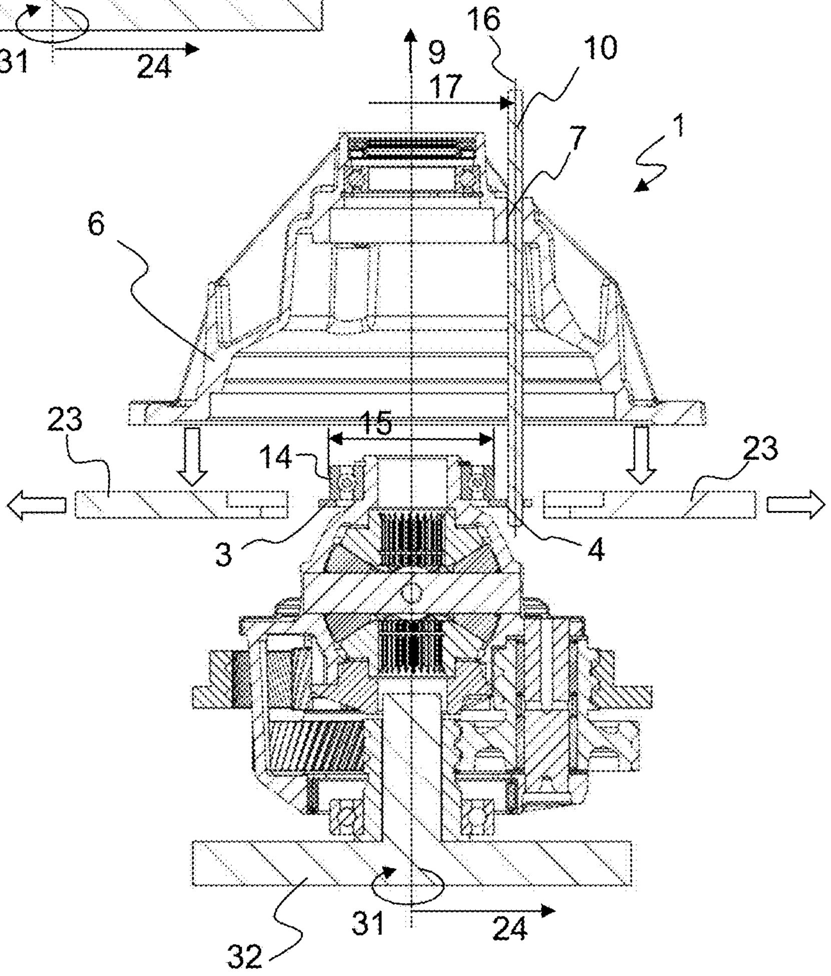
FIG. 2: Step c) of the method with the parts of the component according to FIG. 1 in a side view in section.

FIG. 1 shows a motor vehicle 25 with a drive train 2 (indicated) and a part of a first embodiment of a component 1 in a side view in section. FIG. 2 shows step c) of the method with the parts 3, 6, 14 of component 1 according to FIG. 1 in a side view in section. FIGS. 1 and 2 are described together below.

Component 1 comprises a bearing support part as a first part 3 with a plurality of threaded holes 4, 5 and a housing part of a differential shown in FIG. 2 as a second part 6 with a corresponding number of through-holes 7, 8, 28. A third part 14 is arranged along the axial direction 9 between the first part 3 and the second part 6, which is arranged in a stationary manner (in the component 1) by the first part 3 and the second part 6 by the assembly of the component 1 relative to the axial direction 9 (see FIG. 4). The third part 14 is a rolling bearing, which is arranged in a fixed position relative to the axial direction 9 by the first part 3 in relation to the second part 6. The rolling bearing is designed as a ball groove bearing.

The first part 3 is ring-shaped or disc-shaped. The first part 3 is designed as a sheet metal part. The threaded holes 4, 5 are evenly distributed along a circumferential direction 31 (see FIG. 3). Exactly three threaded holes 4, 5 are provided. The threaded holes 4, 5 are designed as through holes.

A first end face 18 of the first part 3 pointing towards the third part 14 is completely flat. The other end face of the first part 3, which points in the opposite axial direction 9, is also completely flat. The first part 3 is therefore disc-shaped with parallel and completely flat end faces. Accordingly, the first part 3 can be manufactured as a simple, flat sheet metal part and without further forming.

The second part 6 is a housing part of component 1 or the differential. The second part 6 is a part produced by a casting process, i.e. a cast part. The through holes 7, 8, 28 are evenly distributed along a circumferential direction 31. Exactly three through holes 7, 8, 28 are provided. The through holes 7, 8, 28 do not have a thread, so that the guide elements 10, 11, 27 are accommodated in the through holes 7, 8, 28 so that they can be displaced along the axial direction 9. The number of threaded holes 4, 5 in the first part 3 corresponds to the number of through holes 7, 8, 28 in the second part 6.

The threaded holes 4, 5 and the through holes 7, 8, 28 extend parallel to each other along the axial direction 9.

The guide elements 10, 11, 27 are pin-shaped and cylindrical. The guide elements 10, 11, 27 have a thread at one end so that they can be connected to the thread of the respective threaded hole 4, 5 via the thread.

The third part 14, which is designed as a rolling bearing, comprises an outer ring 19, an inner ring 20 and rolling elements 21 arranged between them. The first part 3, which is designed as a bearing support part, contacts the rolling bearing only via the outer ring 19 and a second end face 22 of the outer ring 19, which contacts the bearing support part, is completely flat (except for the chamfers on the respective edges of the outer ring 19).

The second end face 22 of the outer ring 19, which is flat or parallel to the radial direction 24, ensures low manufacturing costs for the rolling bearing because it can be integrated into the component 1 as a simple purchased part (without special adaptations, i.e. shoulders, centring surfaces, etc.).

As a result of the shape or design of the third part 14 and the first part 3, no alignment of the first part 3 (the bearing support part) is possible or guaranteed, at least not in relation to the radial direction 24 and/or the circumferential direction 31 or in relation to the second part 6. This alignment of the first part 3 (or the bearing support part) is guaranteed exclusively via the guide elements 10, 11, 27 (and later via the screw elements 12, 13).

The third part 14 is provided as (part of) an assembly, whereby the assembly is a differential. The third part 14 is part of the assembly. The third part 14, designed as a rolling bearing, is arranged via the inner ring 20 on a cylindrically designed section of the assembly or a differential housing 30 and is fixed in place on the latter relative to the axial direction 9 via a retaining ring 29 (as well as via shoulders on the assembly).

According to step a), the first part 3 and the second part 6 (as well as the third part 14) are provided. According to step b), the guide elements 10, 11, 27 are arranged in the threaded holes 4, 5 of the first part 3, with each guide element 10, 11, 27 extending through one of the through holes 7, 8, 28 (see FIG. 2).

Before step c), the guide elements 10, 11, 27 are arranged in the threaded holes 4, 5 and extend through the through holes 7, 8, 28. The guide elements 10, 11, 27 are inserted into the threaded holes 4, 5 of the first part 3 via the through holes 7, 8, 28 of the second part 6 or, alternatively, are first arranged in the threaded holes 4, 5, after which the second part 6 is provided and aligned with the first part 3 via the guide elements 10, 11, 27.

The guide elements 10, 11, 27 ensure alignment of the first part 3 relative to the second part 6. This allows screw elements 12, 13 to be fed in later via the second part 6, by means of which the first part 3 is fixed in the component 1. The guide elements 10, 11, 27 ensure that the screw elements 12, 13 are aligned with the threaded holes 4, 5 and can thus be brought into engagement with the thread of the threaded holes 4, 5.

Figure 4:
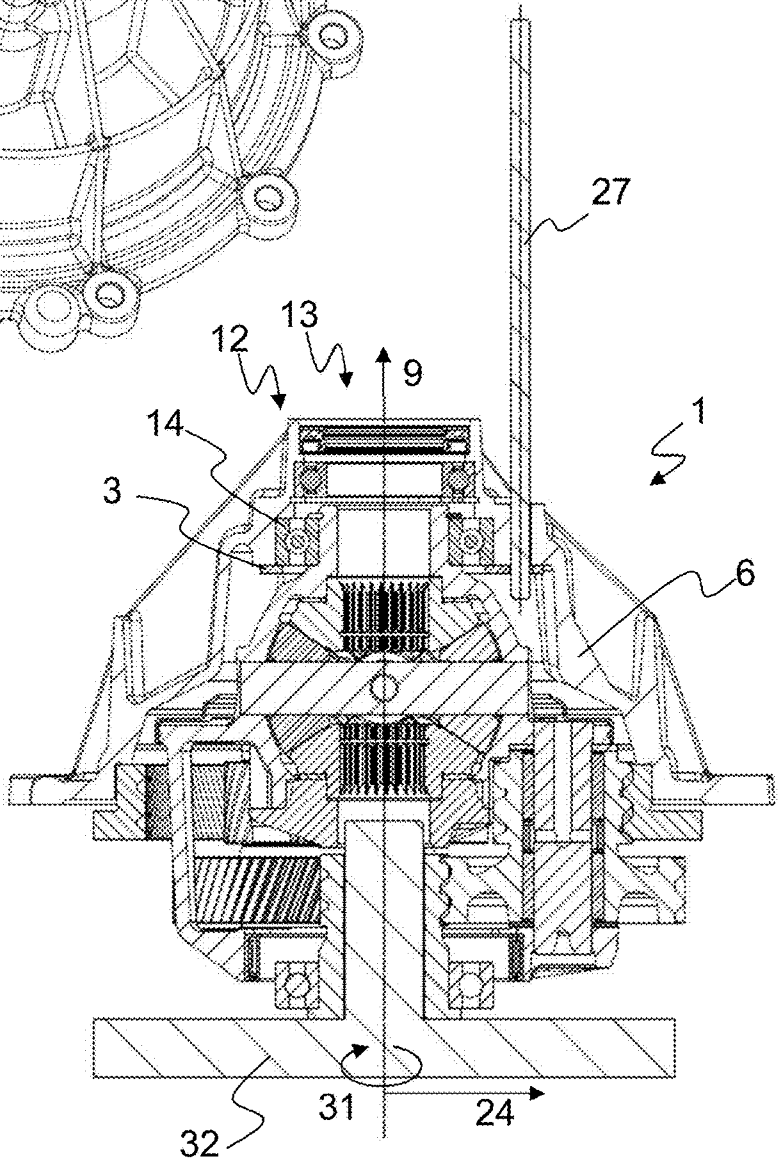
FIG. 4: a sectional side view of the component according to FIG. 3.

The first part 3 is held by a fixing device 23 at least before step c), whereby the fixing device 23 is removed to bring the parts 3, 6 together in accordance with step c) (FIG. 2). FIGS. 1, 2 and 4 show a retaining device 32 which can be used to carry out steps a) to e) of the method.

In step c), the first part 3 (together with the third part 14) and the second part 6 are brought together along the axial direction 9. The parts 3, 6, 14 are previously arranged at a distance from one another along the axial direction 9 and are arranged in a position relative to one another as part of step c), in which they are then inserted in the drive train 2 (corresponding to the position of the parts 3, 6, 14 according to FIG. 4). During step c), i.e. while the parts 3, 6, 14 are being brought together, the parts 3, 6 are aligned with respect to each other via the guide elements 10, 11, 27.

In step c), the second part 6 is displaced relative to the guide elements 10, 11, 27 and relative to the first part 3 (as well as the third part 14) along the axial direction 9 (see FIG. 2).

Before step c), the first part 3 is only aligned relative to the second part 6 (and the third part 14) by the fixing device 23 with respect to a radial direction 24 running transversely to the axial direction 9 (see FIG. 1).

The fixing device 23 can be used to ensure alignment of the first part 3 relative to the second part 6 and relative to the radial direction 24 and possibly also the circumferential direction 31, so that the guide elements 10, 11, 27 can be arranged in the threaded holes 4, 5 via the through-holes 7, 8, 28.

The fixing device 23 is designed in at least two parts. The individual parts of the fixing device 23 are movable relative to each other at least along the radial direction 24 (see position of the parts of the fixing device 23 in FIG. 1 and FIG. 2). This means that the fixing device 23 can be removed after the first part 3 has been aligned with respect to the second part 6 or after the guide elements 10, 11, 27 have been arranged in the threaded holes 4, 5, so that the second part 6 can be moved into the intended installation position (see FIG. 4).

Removal of the fixing device 23 is necessary if accessibility of the first part 3 is no longer guaranteed after or even during step c) of the method (as shown in FIGS. 1 and 2).

The third part 14 or the outer ring 19 has a largest first diameter 15. All center lines 16 of the threaded holes 4, 5 are arranged on a common second diameter 17, whereby the second diameter 17 is approx. 20% larger than the first diameter 15 (see FIGS. 1, 2 and 14).

With the proposed method of this embodiment, it is possible to arrange the threaded holes 4, 5 on the first part 3 as close as possible to the largest first diameter 15 of the third part 14. This ensures that the first part 3 is arranged as flat as possible on the third part 14. This also enables the parts 3, 6, 14 and thus the component 1 to be designed to be as space-saving as possible.

FIG. 2 shows component 1 during step c). The guide elements 10, 11, 27 (only the first guide element 10 is shown here) extend through the through-holes 7, 8, 28 to the threaded holes 4, 5. The fixing device 23 is removed so that the second part 6 can be displaced along the axial direction 9 in such a way that the second part 6 and the assembly or the first part 3 and the third part 14 can be arranged in an intended installation position (see FIG. 4).

Figure 3:
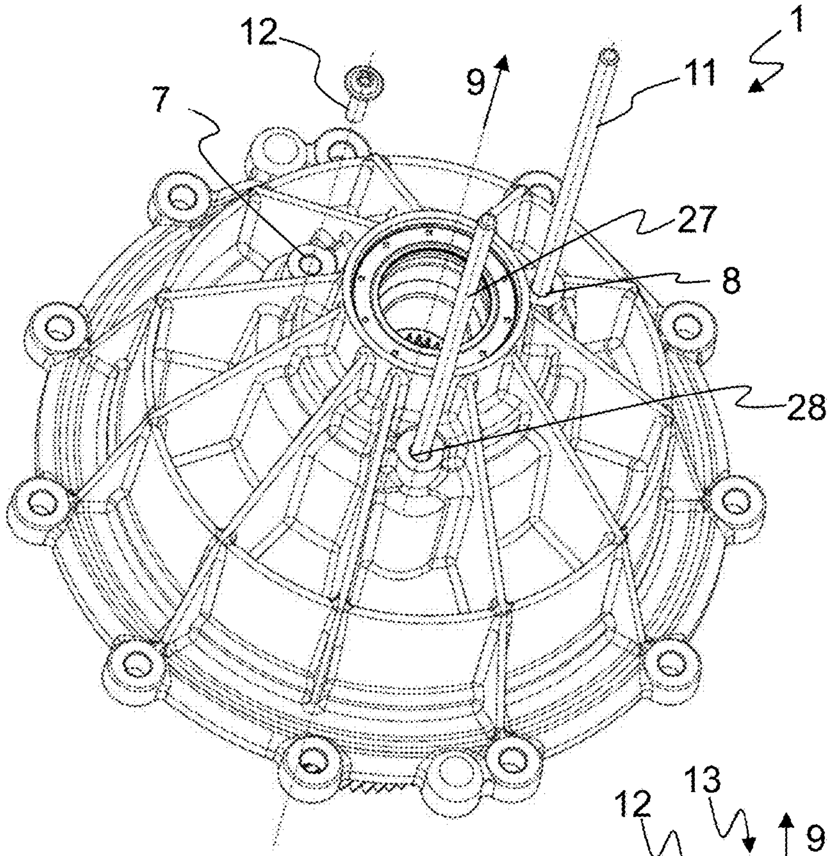
FIG. 3: the component according to FIG. 2 during step e), in a perspective view.

FIG. 3 shows the component 1 according to FIG. 2 during step e), in a perspective view. Reference is made to the explanations in FIGS. 1 and 2.

In step d), the first guide element 10 is first removed from the component 1 and a first screw element 12 is then inserted into a first threaded hole 4 via a first through hole 7. The first screw element 12 is then screwed to the first threaded hole 4 by screwing. The first guide element 10 is thus replaced by the first screw element 12.

In step e), a second guide element 11 is removed from the component 1 and a second screw element 13 is inserted into a second threaded hole 5 via a second through hole 8. In step e), the second screw element 13 is further screwed to the second threaded hole 5. In step e), all further screw elements 12, 13 can be arranged in corresponding through holes 7, 8, 28 and screwed to the threaded holes 4, 5 provided for this purpose. In step e), all guide elements 10, 11, 27 remaining after step d) are removed from component 1. Once all the screw elements 12, 13 provided have been screwed in place, component 1 is (completely) manufactured.

FIG. 4 shows a perspective view of component 1 according to FIG. 2 during step e). Reference is made to the comments on FIGS. 1 to 3.

In FIG. 4, the third guide element 27 is still arranged on component 1. The other guide elements 10, 11 have already been removed and replaced by the screw elements 12, 13. The parts 3, 6, 14 are in the same position in relation to each other as they will be during subsequent operation of component 1.

FIG. 5 shows a perspective view of a first part 3 of a second embodiment of a component 1 before step b). FIG. 6 shows the first part 3 according to FIG. 5 together with a third part 14, in a perspective view. FIG. 7 shows the parts 3, 14 according to FIG. 6 in a side view, partially in section. FIG. 8 shows the parts 3, 14 according to FIGS. 6 and 7 together with a second part 6, in a perspective view. FIGS. 5 to 8 are described together below. Reference is made to the explanations of FIGS. 1 to 4.

FIGS. 9 to 13 show that the guide elements 10, 11, 27 are each made in two parts. The two parts together form a cylindrical, pin-shaped guide element 10, 11, 27.

As in the first embodiment, the first part 3 is designed as a bearing support part. The second part 6 is designed here as a gearbox cover. As in the first embodiment, the third part 14 is designed as a rolling bearing. The explanations relating to the first embodiment with reference to the first part 3 and the third part 14 apply accordingly.

The first part 3 and the third part 14 are part of an assembly forming a transmission 26 (see FIGS. 6 to 14).

According to step a), the first part 3 and the second part 6 (as well as the third part 14) are provided. According to step b), the guide elements 10, 11, 27 are arranged in the threaded holes 4, 5 of the first part 3 (see FIGS. 5 to 7).

FIGS. 5 to 8 show that only the first parts of the guide elements 10, 11, 27 are arranged on the first part 3.

FIG. 9 shows the component 1 according to FIG. 8 together with other parts of the multi-part guide elements 10, 11, 27 in a perspective view. FIG. 10 shows the component 1 according to FIG. 9, during step c), in a perspective view. FIGS. 9 and 10 are described together below. Reference is made to the comments on FIGS. 6 to 8.

In FIG. 9 it can be seen that the second parts of the guide elements 10, 11, 27 are arranged in the through holes 7, 8, 27 of the second part 6. The second part 6 is then moved (independently of or together with) the second parts of the guide elements 10, 11, 27 along the axial direction 9 towards the first part 3 and the first parts of the guide elements 10, 11, 27, so that the different parts of the guide elements 10, 11, 27 are connected to each other and the second part 6 can be displaced further towards the first part 3 by sliding along the guide elements 10, 11, 27 and along the axial direction 9.

Before step c), the guide elements 10, 11, 27 are arranged in the threaded holes 4, 5 and extend through the through holes 7, 8, 28 (see FIG. 10).

The guide elements 10, 11, 27 extend through the through holes 7, 8, 28 towards the threaded holes 4, 5. A fixing device 23, if used, is removed so that the second part 6 can be displaced along the axial direction 9 in such a way that the second part 6 and the assembly or the first part 3 and the third part 14 can be arranged in an intended installation position (see FIGS. 11 to 14).

FIG. 11 shows the component 1 according to FIG. 10, whereby parts (the second parts) of the multi-part guide elements 10, 11, 27 are removed, in a perspective view. FIG. 12 shows component 1 according to FIG. 11, in another perspective view. FIGS. 11 and 12 are described together below. Reference is made to the comments on FIGS. 5 to 10.

In FIGS. 11 and 12, the second parts of the guide elements 10, 11, 27 are removed from the first parts of the guide elements 10, 11, 27. The first parts of the guide elements 10, 11, 27 are still arranged in the threaded holes 4, 5 of the first part 3.

FIG. 13 shows the component 1 according to FIG. 12, during step d), in a perspective view. FIG. 14 shows component 1 according to FIG. 13, after step d), in a side view, partially in section. FIGS. 13 and 14 are described together below. Reference is made to the comments on FIGS. 5 to 12.

In step d), the (first part of the) first guide element 10 is first removed from the component 1 and a first screw element 12 is then inserted into a first threaded hole 4 via a first through hole 7. The first screw element 12 is then screwed to the first threaded hole 4 by screwing. The first guide element 10 is thus replaced by the first screw element 12.

In step e) (see FIG. 14), a second guide element 11 (or all further guide elements 11, 27) is removed from the component 1 and at least a second screw element 13 is inserted into a second threaded hole 5 via a second through-hole 8. In step e), the second screw element 13 is further screwed to the second threaded hole 5. In step e), all further screw elements 12, 13 are arranged in corresponding through holes 7, 8, 28 and screwed to the threaded holes 4, 5 provided for this purpose. In step e), all guide elements 10, 11, 27 remaining after step d) are removed from component 1. Once all the screw elements 12, 13 provided have been screwed together, component 1 is (completely) manufactured.

Furthermore, in general, while a multitude of embodiments have been depicted and described with a multitude of components in each embodiment, in alternative embodiments the components of various embodiments could be intermixed, combined, and/or exchanged for one another. In other words, components described in connection with a particular embodiment are not necessarily exclusive to that particular embodiment.

As used herein, the terms “general,” “generally,” and “approximately” are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms “for example,” “for instance,” “such as,” and “like,” and the verbs “comprising,” “having,” “including,” and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 component
2 drive train
3 first part
4 first threaded hole
5 second threaded hole
6 second part
7 first through hole
8 second through hole
9 axial direction
10 first guide element
11 second guide element
12 first screw element
13 second screw element
14 third part
15 first diameter
16 center axis
17 second diameter
18 first end face
19 outer ring
20 inner ring
21 rolling element
22 second end face
23 fixing device
24 radial direction
25 motor vehicle
26 gearbox
27 third guide element
28 third through hole
29 circlip
30 differential housing
31 circumferential direction
32 retaining device

The invention claimed is:

1. A method of assembling a component of a drive train, the component comprising at least a first part having a plurality of threaded holes and a second part having a corresponding number of through holes, the threaded holes and through holes each extending along an axial direction; the method comprising at least the following steps:

a) providing the first part and the second part;

b) arranging at least two guide elements in the threaded holes of the first part, wherein each guide element extends through one of the through holes;

c) bringing together the first part and the second part along the axial direction, the parts being aligned with respect to one another via the guide elements;

d) inserting a first screw element via a first through hole into a first threaded hole and screwing the first screw element; and e) removing a guide element from the component and inserting a second screw element via a second through hole into a second threaded hole and screwing the second screw element to produce the component, wherein a third part is arranged along the axial direction between the first part and the second part, which third part is arranged in a stationary manner relative to the axial direction by the first part and the second part by the assembly of the component, and the third part has a largest first diameter and each center axis of the threaded holes are arranged on a common second diameter, wherein the second diameter is at most 30% larger than the first diameter.

2. The method according to claim 1, wherein the first part is annular and at least a first end face pointing towards the third part is completely flat.

3. The method according to claim 1, wherein the first part is held by a fixing device at least before step c), wherein the fixing device is removed to bring the parts together according to step c).

4. The method according to claim 3, wherein the first part, at least before step c), is aligned with respect to a radial direction, extending transversely to the axial direction, only by the fixing device at least with respect to the second part.

5. A component of a drive train of a motor vehicle, comprising at least a first part with a plurality of threaded holes and a second part with a corresponding number of through holes, wherein a screw element extends through each through-hole into a respective threaded hole along an axial direction, so that the parts are connected to one another by the screw elements, wherein the component is assembled by a method according to claim 1, and wherein the component additionally comprises a third part, wherein the first part is a bearing support part, the second part is a housing part of the component and the third part is a rolling bearing.

6. The component according to claim 5, wherein the first part is aligned exclusively by the screw elements relative to a radial direction, extending transversely to the axial direction, relative to the second part.

7. The component according to claim 5, wherein the component is at least an assembly of a transmission.

8. A method of assembling a component of a drive train, the component comprising at least a first part having a plurality of threaded holes and a second part having a corresponding number of through holes, the threaded holes and through holes each extending along an axial direction; the method comprising at least the following steps:

a) providing the first part and the second part;

b) arranging at least two guide elements in the threaded holes of the first part, wherein each guide element extends through one of the through holes;

c) bringing together the first part and the second part along the axial direction, the parts being aligned with respect to one another via the guide elements;

d) inserting a first screw element via a first through hole into a first threaded hole and screwing the first screw element; and e) removing a guide element from the component and inserting a second screw element via a second through hole into a second threaded hole and screwing the second screw element to produce the component, wherein a third part is arranged along the axial direction between the first part and the second part, which third part is arranged in a stationary manner relative to the axial direction by the first part and the second part by the assembly of the component, and the third part is a rolling bearing and the first part is a bearing support part for fastening the rolling bearing in the component.

9. The method according to claim 8, wherein the rolling bearing comprises at least an outer ring, an inner ring and rolling elements arranged therebetween, wherein the bearing support part contacts the rolling bearing via the outer ring and a second end face of the outer ring contacting the bearing support part is completely flat.

* * * * *